United States Patent [19]

Duret et al.

[11] Patent Number: 5,236,750
[45] Date of Patent: Aug. 17, 1993

[54] APPARATUS INTENDED TO CONTAIN HYDROFLUORIC ACID, WITH A METAL WALL COATED WITH A PROTECTIVE MATERIAL

[75] Inventors: Robert Duret, Brindas; Gilles Finaz, Lyons; Cu Cuong Trinh, Caluire; Olivier Vittori, Villeurbanne, all of France

[73] Assignee: Antirouille, Metz, France

[21] Appl. No.: 535,564

[22] Filed: Jun. 11, 1990

[30] Foreign Application Priority Data

Jun. 19, 1989 [FR] France .................. 89 08732

[51] Int. Cl.$^5$ .................................. B32B 5/16
[52] U.S. Cl. ........................ 428/35.7; 206/524.2; 206/524.3; 206/524.4; 220/454; 220/470; 220/DIG. 24; 428/403; 428/465; 428/328
[58] Field of Search ............... 428/457, 465, 492, 403, 428/404, 36, 328; 220/469, DIG. 24, 454, 470; 206/524.2, 524.3, 524.5, 524.4; 106/14.05, 14.21, 14.44, 403, 459, 479

[56] References Cited

U.S. PATENT DOCUMENTS 3,659,108  4/1972  Quase .................... 252/633
3,896,963  7/1975  Schisler ................ 220/461
4,140,172  2/1979  Corey .................... 165/81
4,965,102  10/1990 Inai et al. ............. 427/374.4

FOREIGN PATENT DOCUMENTS 1156922  11/1963  Fed. Rep. of Germany.
2024359  11/1969  France.

OTHER PUBLICATIONS

Ullmans Encyklopadie der Technischen Chemie, Band 11, 1976, p. 602.

Primary Examiner—Paul J. Thibodeau
Assistant Examiner—Hoa T. Le
Attorney, Agent, or Firm—Oliff & Berridge

[57] ABSTRACT

The present invention relates to protection against the corrosive action of hydrofluoric acid.

According to the invention it has been found that a material consisting of an elastomeric substrate or matrix and a filler of metal particles dispersed in the substrate, of a metal which can be oxidized by ionized hydrofluoric acid, can limit or prevent the diffusion of hydrofluoric acid.

The materials according to the invention can be employed in all the suitable forms, especially as sheets, for protecting metal walls.

25 Claims, No Drawings

APPARATUS INTENDED TO CONTAIN HYDROFLUORIC ACID, WITH A METAL WALL COATED WITH A PROTECTIVE MATERIAL

BACKGROUND OF THE INVENTION

The present invention relates to protection against hydrofluoric acid and it deals more particularly with various items of apparatus intended to contain hydrofluoric acid and comprising a metal wall coated with a material for protection against the chemical corrosion by hydrofluoric acid.

In the trade hydrofluoric acid is known in various forms which vary correspondingly in their corrositivies towards materials forming the walls of items of apparatus intended to contain it.

Anhydrous hydrofluoric acid is inert towards common steel, with the result that the problem of protecting the metal walls does not arise, provided that moisture, even in the form of traces, is prohibited from entering the apparatus.

Hydrofluoric acid called "purified 70%" contains sulfuric acid in order to inhibit steel corrosion. In fact, tests have shown that the addition of 3% of sulfuric acid allows hydrofluoric acid solutions to be stored and handled in contact with common steel, in a concentration of 70% or higher. The presence of the inhibitor (sulfuric acid) in hydrofluoric acid at this relatively high concentration is acceptable for some uses, for example for matting glass and for engraving porcelain and ceramics. On the other hand, in the case of economically very important uses such as the preparation of inorganic, especially uranium, fluorides, the separation of rare earths and the manufacture of electronics components, the presence of sulfuric acid to inhibit the corrosion is unacceptable.

Hydrofluoric acids known as "crystal 70%" and "crystal 50%" contain essentially ionized hydrofluoric acid in concentrations of 70% and 50% by weight respectively. These two forms are guaranteed to contain less than 0.03% of sulfuric acid. At this concentration there is no longer any inhibiting effect and the extreme corrosiveness of hydrofluoric acid towards metals is found, except for platinum, gold, silver and mercury, metals which cannot be chosen for forming a metal wall. Similarly, most so-called stainless alloys are rapidly attacked by these two solutions of hydrofluoric acid, so that the chemical industry is constrained to use only corrosion-resistant alloys which are very high in cost and tricky to fabricate, such as the alloys.

chlorinet 2, of composition having in percent by weight 63% Ni, 32% Mo, 3% Fe, 1% Si of composition having in percent by weight 60% Ni, 18% Mo, 18% Cr, 1% Si, as well as certain Monel alloys based on nickel and copper, doped with other elements. It is found that even with these noble alloys, heavy-metal cations from the alloys transfer into solutions of hydrofluoric acid and subsequently act as contaminants in the processes where acids of "crystal" quality are employed.

DESCRIPTION OF THE PRIOR ART

In accordance with the following document: Ullmanns Encyklopadie der Technischen Chemie, Vol. 11, 1976, page 602, Verlag Chemie publishers, Weinheim, DE, in order to protect a metal wall against the corrosive effect of hydrofluoric acid in an ionized form it is known to coat this wall with an elastomeric material, for example in sheet form, which is self-vulcanizing, prevulcanized or vulcanizing at steam pressure or in hot dry air. In fact, these elastomeric materials exhibit some chemical inertness towards hydrofluoric acid and can prevent the contamination of the hydrofluoric acid charge with heavy-metal cations from the metal wall.

However, the Applicant Company has ascertained that a protection of this kind is insufficient, in particular in the presence of large quantities of hydrofluoric acid of so-called "crystal" grades. In fact, acid vapor manages to migrate through the elastomeric coating towards the metal wall and to corrode the latter, with a gas release which causes the coating to blister and which can damage it permanently.

SUMMARY OF THE INVENTION

The subject of the present invention is an apparatus such as envisaged above, comprising a metal wall coated on its inner face with a protective material the substrate of which consists of at least one elastomeric substance and which intrinsically opposes the migration of hydrofluoric acid through its thickness.

According to the present invention it has surprisingly been found that such a barrier can be obtained by dispersing and distributing in the elastomeric substrate particles of at least one metal which can be oxidized by ionized hydrofluoric acid.

Obviously, according to the present invention, a number of different metals can be dispersed in the elastomeric substance.

"Apparatus", within the meaning of the present invention, should be understood to mean any device, system or object intended to contain hydrofluoric acid, comprising a metal wall in contact with the latter. This concept will include storage tanks, conveying lines, chemical reactors, handling equipment, use devices, and the like, it being obvious that this list does not constitute a limit.

"Material", within the meaning of the present invention, should be understood to mean any form of presentation, such as sheets, mastics, seals, coatings, and the like, which can be chosen or adopted according to the uses and applications. And, as already said, these forms may be vulcanized already, self-vulcanizing, prevulcanizing or vulcanizing with stream pressure or in hot dry air.

In accordance with document FR-A-2,024,359, there has already been described an elastomeric substance filled with a metal powder distributed and dispersed in the substrate and whose nature is chosen from the metals Cu, Zn, Sn, Al, Cr, Mg and Ti or alloys such as brass, bronze and steel. However, the purpose or function of this powder is to strengthen the elastomeric material and to improve its mechanical properties. Moreover, the novel function, disclosed according to the present invention, namely of forming an effective barrier against hydrofluoric acid is neither described nor suggested in the document FR-A-2,024,359.

The present invention is now described with reference to the various experiments set out below.

With regard to the elastomeric substances which can be employed according to the present invention, the group preferably adopted has been that of the following products, which were chosen using traditional tests of immersion of a specimen in solutions of hydrofluoric acid at concentrations increasing up to 70%:

butyl rubbers, which are copolymers of isobutylene with a small quantity of isoprene, in order to permit vulcanization using the same processes as natural rubber; halobutyl rubbers, which are a variety similar to butyl, from which they differ solely in the presence of additional crosslinking sites obtained by substitution of hydrogen atoms with chlorine or with bromine; chlorobutyls and bromobutyls have a satisfactory inertness towards hydrofluoric acid solutions, which is similar to that of the butyls;

chlorosulfonated polyethylene rubbers such as those marketed under the trademark Hypalon (Du Pont);

chlorinated rubbers, which contain up to 60% of chlorine.

To confirm the ability of the elastomers selected as above to resist the corrosive action of hydrofluoric acid with time, accelerated aging tests were then undertaken.

Steel plates were coated, according to the usual technique, with sheets of the chosen elastomers. The coated plates were subjected beforehand to a vulcanization cycle under steam pressure in an autoclave, characterized by:

a steady rise in temperature up to 100° C. at a rate of 1.5 degrees per minute;

holding at 100° C. for 60 minutes;

a new steady rise in temperature by admitting steam, up to 125° C. at a rate of 0.5° per minute;

holding at 125° C. at a steam pressure of 2.3 bars for 180 minutes;

rapid cooling by releasing the steam pressure.

The accelerated aging tests on the coated plates consisted of immersing a first batch of these plates in hydrofluoric acid solutions of increasing concentration up to a concentration of 70%, at a temperature of 50° C., and in subjecting an identical second batch to the vapor above the same solutions in polytetrafluoroethylene vessels thermostatted at 50° C. The coated plates were regularly examined.

With the butyl rubbers, the appearance of blisters was found after 60 days' immersion in the crystal 70% HF solution. With the other elastomers, namely chlorosulfonated polyethylene rubbers and chlorinated rubbers, the blisters appear more rapidly at this concentration, and they are therefore considered to be less resistant.

In the case of concentrations below 70%, the appearance of blisters requires more time, up to a concentration of 38% which corresponds to the azeotropic composition of hydrofluoric acid with water, and below which the butyl rubbers continue to adhere to the metal support during an exposure of more than 250 days.

Investigation of the damage showed that hydrofluoric acid passed through the rubbers and then attacked the steel of the metal wall, with a release of hydrogen and formation of fluorides. However, the butyl sheets were not damaged, in contrast to what is observed in practice when the metal supports are not suitably protected.

Consequently, at this stage of the experiments, the adopted elastomers, and in particular butyl rubbers, though resisting hydrofluoric acid well chemically, are found to be incapable of forming an efficient barrier to the latter in high concentrations.

This is where the distribution and dispersion, in the substrate or matrix of the elastomer, of particles of a metal which can be oxidized by ionized hydrofluoric acid are involved.

With regard to the metals which can be employed according to the invention, the following methods of implementation can be adopted according to the invention.

The preferred metals of the invention are those with an atomic number higher than 21 and lower than 83. They are also defined by the position in the Periodic Table of the elements and the metals which are more particularly suited for implementing the invention are ranked in periods 4, 5 and 6. They are:

in period 4: titanium, vanadium, chromium, manganese, iron, cobalt, nickel, copper and zinc;

in period 5: zirconium, molybdenum, cadmium and tin;

in period 6: thallium and lead.

By means of the experimental procedure described below it was determined that the best results are obtained when the metals are dispersed in a fine and uniform form within the elastomeric matrix. To achieve this, on the one hand, fine powders whose particle size is preferably below 100 micrometers are employed and, on the other hand, the mixture of elastomer and of metal powder is subjected to intense mechanical working with the aid of blending machines employed for the production of rubber-based mixtures, for example a mixer of the Banbury type.

A large quantity of metal powder relative to the weight of elastomer is preferably employed; by way of guidance, metal/elastomer weight ratios of between 0.1 and 1 will be adopted.

In a first stage, the effectiveness of the materials according to the invention, that is to say those filled with a metal powder capable of being oxidized by hydrofluoric acid, was initially tested by diffusion measurements performed comparatively in relation to the elastomeric materials by themselves, chosen as above.

The apparatus employed for this purpose consisted of two polytetrafluoroethylene tubes of bent shape, assembled into a U using equipment with clamps and flanges. A porous disk on which the sheets of the materials to be tested were placed successively was arranged between the flanges. One of the vertical arms of the U mounting was filled with a crystal 70% HF solution, and the other with distilled water. The whole was immersed in a tank thermostatted at 45° C. A relative pressure of 1 bar was applied above the HF solution throughout the test period, and the pH of the distilled water contained in the other branch was measured continously.

For a given elastomeric material, all the tests carried out showed that:

the elastomeric material by itself produced a lowering of pH in the U-tube arm containing distilled water; migration of hydrofluoric acid through the material is therefore taking place;

the same elastomeric material filled with metal particles resulted in a stability of the pH in the U-tube arm containing distilled water; migration through the material appeared therefore to be very limited or even nil.

This property appears to be completely unexpected because, to block the diffusion, it could be thought that it was necessary to lay flat on at least one face of the elastomeric sheet a continuous layer of a metal or of an alloy which cannot be oxidized by ionized hydrofluoric acid, that is to say of a precious metal or of a noble alloy as stated above.

An explanation of this quite remarkable property was sought a posteriori. It is possible to postulate that the hydrofluoric acid which diffuses in the elastomer, either in molecular form or in the form of hydrates of very variable stabilities, reacts at the surface of the metal particles, giving heavy-metal cations. These cations probably have a low mobility within the elastomeric material, or even a virtual immobility. Their progressive accumulation with time at the diffusion front of hydrofluoric acid would thus appear to form an osmotic barrier. This is merely a plusible hypothesis, and if other kinds of explanations were to replace it or to invalidate it, it would not in any way affect the wholly surprising nature of the present invention.

In a second stage of experiments, the invention was concerned with the application of these metals to the metal walls of any apparatus intended to contain hydrofluoric acid, especially of "crystal" grade.

In general, all these items of apparatus can be coated with a sheet of a material according to the invention. An effective barrier against the diffusion of hydrofluoric acid towards, the metal wall of the apparatus is obtained already at this stage.

DESCRIPTION OF THE PREFERRED EMBODIMENTS

It has been ascertained, however, that it is preferable to insert between the sheet of a material according to the invention and the steel metal wall a layer of an elastomer optionally of the same kind as the elastomer of the substrate or matrix of the sheet according to the invention. Such a layer forms a screen to prevent the direct contact between the steel and the metal particles, and possibly the cations which they form on being oxidized by the action of the hydrofluoric diffusion front. This arrangement is not indispensable in all cases, since it depends at the same time on the thickness of the vulcanized sheets according to the invention, on the uniformity of dispersion of the metals, on their rate of oxidation by hydrofluoric acid and, finally, on the mobility of the heavy-metal cations, very low though it may be. In the choice of this layer forming a screen near the metal wall a very good adhesiveness is additionally sought after, both to the steel and to the elastomeric sheet, as is also an excellent cohesion of the substance.

In a preferred embodiment of the invention, the screen employed is another sheet of elastomer of a nature similar to or different from that constituting the sheet forming a barrier according to the invention and, when the extrusion technique is employed, it is particularly advantageous to coextrude the sheet and its screen simultaneously through a flat die, using elastomers of the same kind. An excellent bond is thus produced between the sheet and its screen. However, any other methods of manufacturing and assembling sheets, which are employed in the industry of conversion of elastomers are also suitable. Extrusion and calendering of sheets, followed by their assembly by backing in the calender or by lamination on a machine for making composites may be mentioned, among others.

Continuing with the application of a sheet of a material according to the invention to a metal wall, including with another sheet forming a screen, it is advisable to ensure that the said sheets prevent any diffusion towards the hydrofluoric acid charge of the heavy-metal cations which they contain as a result of the oxidation of the metal particles by the hydrofluoric acid diffusion front.

In general, this objective appears to be met. No significant contamination of the hydrofluoric acid charge with heavy cations is observed. This being so, it is possible, still according to the invention, to arrange on the other side of the sheet of the material according to the invention, that is to say facing the metal wall, another layer of an elastomer forming a screen against the hydrofluoric acid charge; this other layer may, as before, be of the same kind as the elastomer of the substrate or matrix of the metal-filled sheet.

In the case where the sheet of the material according to the invention comprises on both sides two other layers either of the same or of another elastomeric material, a protective sandwich is finally obtained, forming the most elaborate method of protection according to the invention. This highly effective method of protection has the advantage of providing the best conditions for establishing an ionic equilibrium, to which the effect of a diffusion barrier against hydrofluoric acid could be attributed.

Without any limitation being implied, examples are given below of sheets of protective materials according to the present invention, which have been tested with regard to their barrier effect on hydrofluoric acid, by means of the apparatus described above with a U-tube.

Starting with a butyl rubber resin manufactured by Esso-Chem Europ Inc. or by Polysar, five mixtures are prepared, referred to as: T in the case of the control without metal particles, and Fe-Ni-Zn-Sn in the case of the mixtures containing the metal powders of iron, nickel, zinc and tin respectively.

The composition of the control T is the following:
100 parts by weight of butyl rubber
90 parts by weight of G.P.F. carbon black
5 parts by weight of AC 617 A polyethylene as processing aid
5 parts by weight of zinc oxide and, as a vulcanization system:
2 parts by weight of sulfur
2 parts by weight of an accelerator such as tetramethylthiuram disulfide.

The compositions of the other four mixtures differ from that of the control T only in the addition of 80 parts by weight of metal powders or particles. They are, respectively:

Fe mixture: iron powder with a particle size below 10 micrometers

Ni mixture: nickel powder with a particle size below 60 micrometers

Zn mixture: zinc powder with a particle size below 60 micrometers

Sn mixture: tin powder with a particle size below 70 micrometers.

The mixtures are homogenized in an internal mixer of the Banbury type and are then extruded separately for convenient control. So-called raw sheets, 1.5 mm in thickness, were thus manufactured, from which samples were taken. The latter were subjected to the vulcanization cycle described above with a view to the aging tests.

The compatibility of the control according to the test of the same name was checked first of all and the diffusion tests were then performed on the five different sheets. The results were as follows:

Reference control T:
The pH drops from the 4th day onwards, which represents the time needed for the diffusion front to cross the sheet. The pH reaches a value of 2 on the 15th.

Fe reference:

The pH reaches 6.2 on the thirtieth day and then remains constant up to 200 days, on which date the measurements are stopped.

Ni reference:

The pH comes down to 5 in 50 days and then remains constant.

Zn reference:

The pH drops steadily down to 5.5, a value reached over 40 days; the pH then remains constant.

Sn reference:

The pH decreases down to 3.5 at the end of 50 days and no longer changes.

Sheets consisting of two layers were then manufactured using the calender by backing, on the one hand, two control sheets one onto the other and, on the other hand, a control sheet onto each of the sheets which contain the metal powders. Double-layer sheets with a thickness of 3 mm were thus obtained, symbolized by the abbreviated references to each layer: TT, TFe, TNi, TZn, TSn.

These two-layer sheets were used to coat steel plates using the technique employed in chemical engineering. Care was taken that the layer T, which is free from metal powder, should be applied well against the surface of the steel plates in the case of each coating. A second screen was then manufactured on these coatings with the aid of reference sheets T, and care was taken that the joints should not be superposed, as is commonplace when two coatings are produced successively one over the other starting with the same single support.

The plates thus coated were subjected to the same vulcanization cycle as above, and, to conclude, accelerated aging tests were performed with these plates in crystal 50% HF and crystal 70% HF hydrofluoric acid solutions.

After an accelerated aging period of 250 days according to the test method described above, the final coatings symbolized by the abbreviated references to each of their layers: TTT, TFeT, TNiT, TZnT and TSnT, were examined and the plates were stripped bare.

With the TTT coating which contains no metal dispersion major damage was observed: swellings, blisters and separations. The latter began to appear starting at 40 days. With the other coatings TFeT, TNiT, TZnT and TSnT, which have a common feature, namely an elastomeric sheet containing a dispersion of metal powder sandwiched between two sheets of butyl elastomer, neither any change in the coatings nor damage to the metal plates was observed. Lastly, analyses for heavy-metal cations in the hydrofluoric acid solutions which were in contact with these four last coatings remained negative.

The sheets of the materials according to the invention, single or composite as described above, can be fabricated in the conventional manner. The metal structure is produced independently of the internal coating, using boiler making techniques, and it is generally made of carbon steel. The surfaces of the metal structure which are to be protected are sand-blasted or shot-blasted depending on the degree of roughness of the metal surface which is desired and are then coated with a first layer of an adhesion primer, then with an adhesive and finally with the sheet of the material according to the invention which provides the actual anticorrosion protection coating.

According to another embodiment of the invention, relating solely to the composite formed by the sheet of the elastomeric material filled with metal particles, to which another unfilled elastomeric sheet is adhesively bonded on one side, this latter sheet is replaced as a screen by an adhesive or a heat-curable resin which can simultaneously act as an adhesive and a screen. The adhesives are generally elastomers dissolved in solvents; the most commonly used heat-curable resins are epoxy and polyurethane resins presented either in two-component form or in single-component form.

What is claimed is:

1. An apparatus intended to contain hydrofluoric acid, comprising a metal wall coated with a material for protection against said acid, comprising a substrate made up of at least one elastomeric substance exposed to an interior of said apparatus, in which particles of at least one metal having an atomic number higher than 21 and lower than 83, but not 48 or 82, and which can be oxidized by ionized hydrofluoric acid are dispersed and distributed in the substrate.

2. The apparatus as claimed in claim 1, wherein the oxidizable metal is chosen from periods 4, 5 and 6 of the Periodic Table of the chemical elements.

3. The apparatus as claimed in claim 2, wherein the oxidizable metal is chosen from the group consisting of titanium, vanadium, chromium, manganese, iron, cobalt, nickel, copper, zinc, zirconium, molybdenum, and tin.

4. The apparatus as claimed in claim 1, wherein the particles of the oxidizable metal have a particle size below 100 micrometers.

5. The apparatus as claimed in claim 1, wherein the oxidizable metal particle substrate weight ratio is between 0.1 and 1.

6. The apparatus as claimed in claim 1, wherein the elastomeric substance has an intrinsic chemical inertness towards hydrofluoric acid.

7. The apparatus as claimed in claim 1, wherein the elastomeric substance is chosen from the group consisting of butyl rubbers, chlorosulfonated polyethylene rubbers and chlorinated rubbers.

8. The apparatus as claimed in claim 7, wherein the elastomeric substance is a halobutyl rubber.

9. The apparatus as claimed in claim 1, wherein the elastomeric substance is in the form of a sheet coated onto the metal wall of said apparatus.

10. The apparatus as claimed in claim 9, further comprising another layer of an elastomer adhesively coupled on one side of said sheet to form a, composite material.

11. The apparatus as claimed in claim 10, wherein another layer of an elastomer is coated to the metal wall between the metal wall and the other side of said sheet.

12. The apparatus as claimed in claim 1, wherein an internal screen is arranged between the metal wall and said substrate, and said internal screen consists of an adhesive or a heat-curable resin in contact with the metal wall to be protected.

13. A material intended specifically for protecting a metal wall against hydrofluoric acid, comprising a substrate made up of at least one elastomeric substance, in which particles of at least one metal having an atomic number higher than 21 and lower than 83, but not 48 or 82, and which can be oxidized by ionized hydrofluoric acid, are dispersed and distributed in the substrate, and in which the substrate is in a form selected from the group consisting of a self-vulcanizing form, a prevulcanized form, a form vulcanized with pressurized steam and a form vulcanized in hot dry air.

14. A method for protecting a metal wall from essentially ionized hydrofluoric acid comprising:

dispersing and distributing particles of at least one metal having an atomic number which is higher than 21 and lower than 83, but not 48 or 82, and which can be oxidized by ionized hydroflouric acid in a substrate made of at least one elastomeric material, applying the substrate containing said dispersed metal particles onto said metal wall, so as to obtain a barrier opposing the migration of said ionized hydrofluoric acid towards said metal wall.

15. A method as claimed in claim 14, further comprising contacting said barrier with hydrofluoric acid having a concentration over 50% and containing no corrosion inhibitor.

16. A method as claimed in claim 15, wherein the oxidizable metal is chosen from periods 4, 5 and 6 of the Periodic Table of the chemical elements.

17. A method as claimed in claim 16, wherein the oxidizable metal is selected from the group consisting of vanadium, chromium, manganese, iron, cobalt, nickel, copper, zinc, zirconium, molybdenum, tin, and titanium.

18. A method as claimed in claim 14, wherein the particles of the oxidizable metal have a particle size below 100 micrometers.

19. A method as claimed in claim 14, wherein an oxidizable metal particle/substrate weight ratio is between 0.1 and 1.

20. A method as claimed in claim 14, wherein the elastomeric substance is selected form the group consisting of butyl rubbers, halobutyl rubbers, chlorosulfonated polyethylene rubbers and chlorinated rubbers.

21. A method as claimed in claim 20, wherein the elastomeric substance is butyl rubber.

22. A method as claimed in claim 14, wherein the substrate containing said dispersed metal particles is applied onto said metal wall in the form of a sheet.

23. A method as claimed in claim 22, further comprising adhesively coupling another layer of an elastomer on one side of the sheet, in the form a composite material, between the metal wall and said sheet.

24. A method as claimed in claim 23, further comprising adhesively coupling another layer of an elastomer on the other side of the sheet, to form a composite material.

25. A method as claimed in claim 22, wherein said sheet is applied onto said metal wall through an adhesive or a heat-curable resin in contact with said metal wall.

* * * * *